(12) United States Patent
Carlson

(10) Patent No.: US 6,226,584 B1
(45) Date of Patent: May 1, 2001

(54) METHOD AND APPARATUS FOR ADAPTIVELY SHIFTING A POWERSHIFT TRANSMISSION

(75) Inventor: Douglas A. Carlson, Morton, IL (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 09/299,293

(22) Filed: Apr. 26, 1999

(51) Int. Cl.$^7$ .............................. F16H 59/00; B60K 41/10
(52) U.S. Cl. .................................. 701/51; 701/55; 74/335; 74/336 R; 477/120; 477/124; 475/123
(58) Field of Search ........................ 701/51, 55; 477/124, 477/120; 475/123; 74/335, 336 R

(56) References Cited

U.S. PATENT DOCUMENTS

| | | | |
|---|---|---|---|
| 4,155,277 | 5/1979 | Minami et al. ........................ 74/866 |
| 5,079,972 | 1/1992 | Iizuka .................................... 74/866 |
| 5,217,097 | 6/1993 | Lasoen ................................ 192/3.58 |
| 5,251,443 | 10/1993 | Ehrlinger et al. ...................... 60/426 |
| 5,335,566 | * | 8/1994 | Genise et al. ....................... 477/124 |
| 5,341,703 | 8/1994 | Palansky et al. ....................... 477/65 |
| 5,396,420 | 3/1995 | Graf ................................. 364/424.1 |
| 5,436,834 | 7/1995 | Graf et al. ......................... 364/424.1 |
| 5,459,658 | 10/1995 | Morey et al. ..................... 364/424.1 |
| 5,470,290 | * | 11/1995 | Minowa et al. ..................... 477/115 |
| 5,553,453 | 9/1996 | Coutant et al. ........................ 60/327 |
| 5,557,521 | 9/1996 | Danz et al. ........................ 364/424.1 |
| 5,568,748 | * | 10/1996 | Carlson et al. ..................... 74/336 R |
| 5,738,606 | * | 4/1998 | Bellinger ............................... 477/111 |
| 5,806,370 | * | 9/1998 | Carlson et al. ......................... 74/335 |
| 5,857,161 | * | 1/1999 | Zeilinger et al. ...................... 701/51 |
| 5,964,675 | * | 10/1999 | Shimada et al. ...................... 475/123 |
| 6,064,935 | * | 5/2000 | You ..................................... 701/55 |

* cited by examiner

Primary Examiner—William A. Cuchlinski, Jr.
Assistant Examiner—Tuan To
(74) Attorney, Agent, or Firm—John W. Morrison

(57) ABSTRACT

A control apparatus for a transmission having a first gear ratio, a second gear ratio, and an output shaft is disclosed. The apparatus includes an actuator assembly which disengages the first gear ratio from the output shaft and engages the second gear ratio to the output shaft in response to an upshift signal. The apparatus further includes a memory device which stores a conservative upshift point and an aggressive upshift point. The apparatus yet further includes a controller operable to read the aggressive shift point and the conservative shift point from the memory device. The controller is further operable to determine if the transmission is operating in a conservative mode of operation or operating in an aggressive mode of operation. The controller is yet further operable to generate the upshift signal at the aggressive upshift point if the transmission is operating in the aggressive mode of operation or generate the upshift signal at the conservative upshift point if the transmission is operating in the conservative mode of operation. A method of controlling a transmission assembly is also disclosed.

14 Claims, 3 Drawing Sheets

METHOD AND APPARATUS FOR ADAPTIVELY SHIFTING A POWERSHIFT TRANSMISSION

TECHNICAL FIELD OF THE INVENTION

The present invention generally relates to a powershift transmission, and more specifically to a method and apparatus for adaptively shifting a powershift transmission.

BACKGROUND OF THE INVENTION

Powershift transmissions control gear ratio changes in accordance with a predetermined shift map which is a function of transmission output speed. In particular, each gear ratio has an associated upshift and downshift point that is preset at the factory. However, each upshift point is a compromise between an aggressive shift point that provides optimum work machine performance and a conservative shift point which prevents hunting, i.e. repetitive upshifting and downshifting. Hunting can cause poor engine performance as well as increase the wear and tear on various transmission components. As a result, if a single upshift point is used, it must be conservative to prevent the undesirable results of hunting.

Conservative shift points occur at higher speeds where it is less likely that the transmission will downshift and begin hunting. When shifting at higher speeds, the power output through the transmission can drop significantly prior to the upshift. This drop in power prior to the upshift is undesirable, especially when rapid acceleration is requested by the operator of the work machine. In fact, during rapid acceleration, a more aggressive shift point can be used with a lessor risk of hunting. Thus, upshifting at the conservative shift point has the drawback of limiting the performance of the work machine when rapid acceleration is requested by the operator.

What is needed therefore is a method and apparatus for adaptively selecting either the aggressive shift point or the conservative shift point which overcomes the above-mentioned drawbacks.

DISCLOSURE OF THE INVENTION

In accordance with a first aspect of the present invention, there is provided a control apparatus for a transmission having a first gear ratio, a second gear ratio, and an output shaft. The apparatus includes an actuator assembly which disengages the first gear ratio from the output shaft and engages the second gear ratio to the output shaft in response to an upshift signal. The apparatus further includes a memory device which stores a conservative upshift point and an aggressive upshift point. The apparatus yet further includes a controller operable to read the aggressive shift point and the conservative shift point from the memory device. The controller is further operable to determine if the transmission is operating in a conservative mode of operation or operating in an aggressive mode of operation. The controller is yet further operable to generate the upshift signal at the aggressive upshift point if the transmission is operating in the aggressive mode of operation or generate the upshift signal at the conservative upshift point if the transmission is operating in the conservative mode of operation.

In accordance with a second aspect of the present invention, there is provided a method of controlling a transmission assembly having a transmission with a first gear ratio, a second gear ratio, and an output shaft; an actuator assembly which disengages the first gear ratio from the output shaft and engages the second gear ratio to the output shaft in response to an upshift signal; a memory device; and a controller. The method includes the steps of storing a conservative upshift point and an aggressive upshift point in the memory device and reading the aggressive shift point and the conservative shift point from the memory device with the controller. The method further includes the steps of determining if the transmission is operating in a conservative mode of operation or operating in an aggressive mode of operation and generating the upshift signal at the aggressive upshift point if the transmission is operating in the aggressive mode of operation or generate the upshift signal at the conservative upshift point if the transmission is operating in the conservative mode of operation.

BEST MODE FOR CARRYING OUT THE INVENTION

Figure 1:
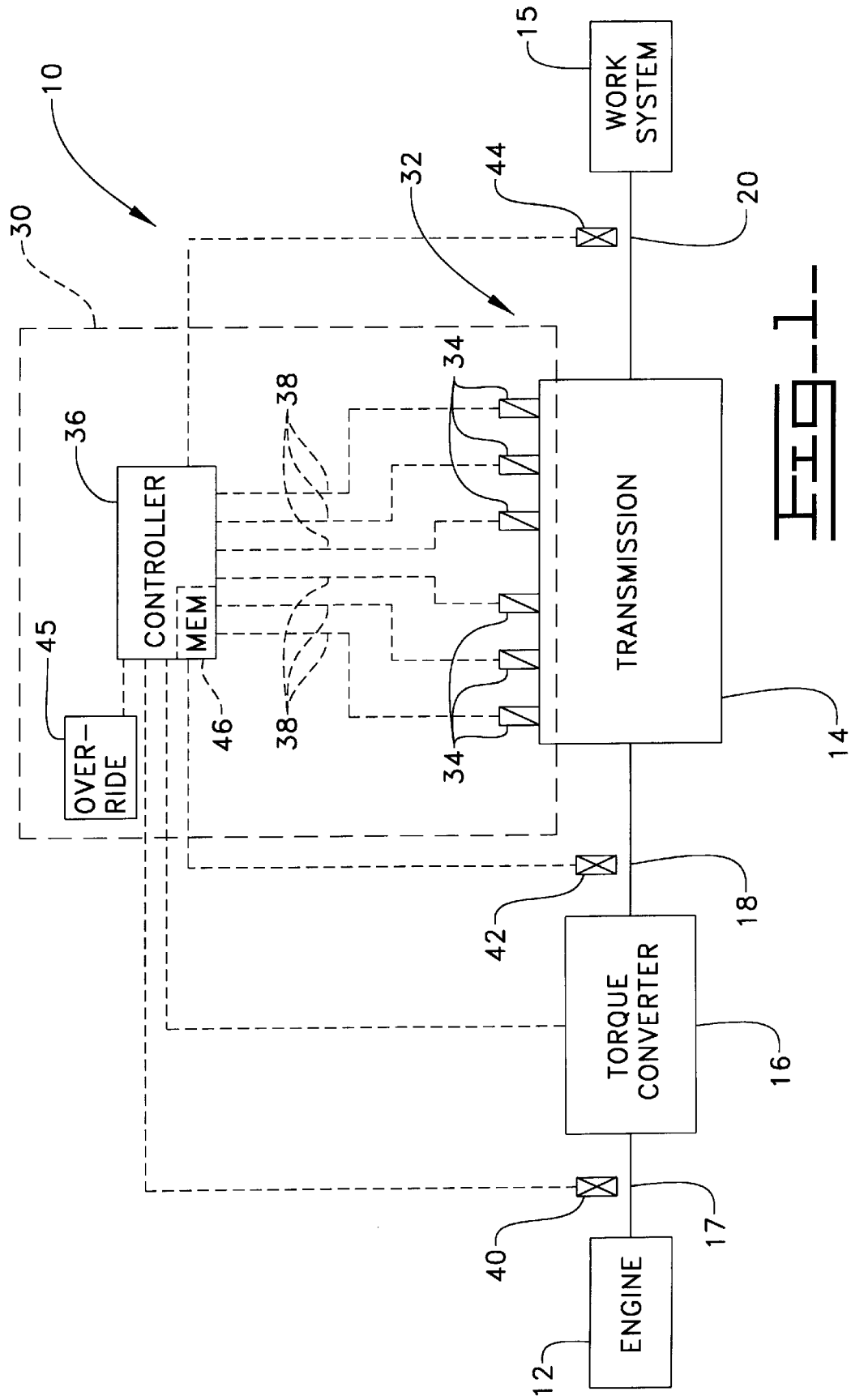
FIG. 1 is a schematic view of a transmission assembly which incorporates the features of the present invention therein.

While the invention is susceptible to various modifications and alternative forms, a specific embodiment thereof has been shown by way of example in the drawings and will herein be described in detail. It should be understood, however, that there is no intent to limit the invention to the particular form disclosed, but on the contrary, the intention is to cover all modifications, equivalents, and alternatives falling within the spirit and scope of the invention as defined by the appended claims.

Referring now to FIG. 1 there is shown a drive train 10 that incorporates the features of the present invention therein. The drive train 10 includes an internal combustion engine 12, a multi-speed powershift transmission 14, and a work system 15. The work system 15 may include drive wheels (not shown), differentials (not shown), axles (not shown) or other mechanisms used to propel a work machine (not shown). Additionally, a fluidic torque converter 16 may also be provided between the engine 12 and the transmission 14. In particular, the input shaft 18 of the transmission 14 is driven by the engine 12 via an engine drive shaft 17 and the torque converter 16. The output shaft 18 drives the transmission 14 which in turn drives a transmission output shaft 20. The transmission output shaft 20 in turn drives the work system 15 which propels the work machine.

The transmission 14 includes a number of gear ratios which can be selectively engaged or disengaged from the transmission output shaft 20 during operation of the drive train 10. In particular, during an upshift from a first gear ratio to second gear ratio, the first gear ratio 51 (shown in FIG. 2)

is disengaged from the transmission output shaft 20 and the second gear ratio 52 (also shown in FIG. 2) is engaged to the transmission output shaft 20.

Similarly, during a downshift from the second gear ratio 52 to the first gear ratio 51, the second gear ratio 52 is disengaged from the transmission output shaft 20 and the first gear ratio 51 is engaged to the transmission output shaft 20. It should be appreciated that the terms "first gear ratio" and "second gear ratio" apply to any adjacent gear ratios between which an upshift or downshift may be initiated and does not imply the lowest two gear ratios of the powershift transmission 14.

The drive train 10 further includes a control apparatus 30. The control apparatus 30 includes an actuator assembly 32 having a number of actuators 34. Each actuator 34 is operable to selectively engage or disengage one of the gear ratios of the transmission 14 with the transmission drive shaft 20 in response to a control signal received via a respective signal line 38.

The control apparatus 30 further includes a controller 36 which receives operator inputs (not shown) and generates shift signals which are directed to the actuators 34 via the signal lines 38. In particular, to effect the upshift from the first gear ratio 51 to the second gear ratio 52, the controller 36 (i) reads the upshift point from the memory device 46 and (ii) generates an upshift signal which causes the actuators 34 associated with the first gear ratio 51 to disengage the first gear ratio 51 from the transmission output shaft 20 and causes the actuators 34 associated with the second gear ratio 52 to engage the second gear ratio 52 to the transmission output shaft 20.

Similarly, to effect the downshift from the first gear ratio 51 to the second gear ratio 52, the controller 36 generates a downshift signal which causes the actuators 34 associated with the second gear ratio 52 to disengage the second gear ratio 52 from the transmission output shaft 20 and causes the actuators 34 associated with the first ratio 51 to engage the first gear ratio 51 to the transmission output shaft 20.

The controller 36 may also receive various other input signals representative of the work machine system parameters, including an engine speed signal from an engine speed sensor 40, a transmission input speed signal from a transmission input speed sensor 42, and a transmission output speed signal from a transmission output speed sensor 44. The sensors 40, 42, 44 are conventional electrical transducers typically of the magnetic speed pickup type.

Internally, the controller 36 comprises a number of conventional devices including a microprocessor (not shown), a timer (not shown) input/output devices (not shown) and a memory device 46. Stored in the memory device 46 are upshift and downshift points that are preprogrammed at the factory. In particular, the memory device 46 stores an aggressive shift point 60, a conservative shift point 62, and a downshift point 64 associated with the shift from the first gear ratio 51 to the second gear ratio 52 (see FIG. 2). The controller reads the aggressive upshift point 60, the conservative upshift point 62, and the downshift point 64 from the memory device 46 prior to generating either the upshift signal or the downshift signal. It should be appreciated that while the single downshift point 64 is disclosed, this invention also contemplates that the downshift point 64 could be varied as the upshift point is varied between the aggressive shift point 60 and the conservative shift point 62. The memory device 36 also stores a set of instructions necessary to cause the controller 36 to implement the present invention.

The control apparatus 30 further includes an override 45 which can either be engaged or disengaged. Typically, the override device would be set by maintenance personnel prior to operation. When the override 45 is engaged, an override signal is directed to the controller 36, which causes upshifts from the first gear ratio 51 to the second gear ratio 52 to occur only at the conservative shift point 62.

Figure 2:
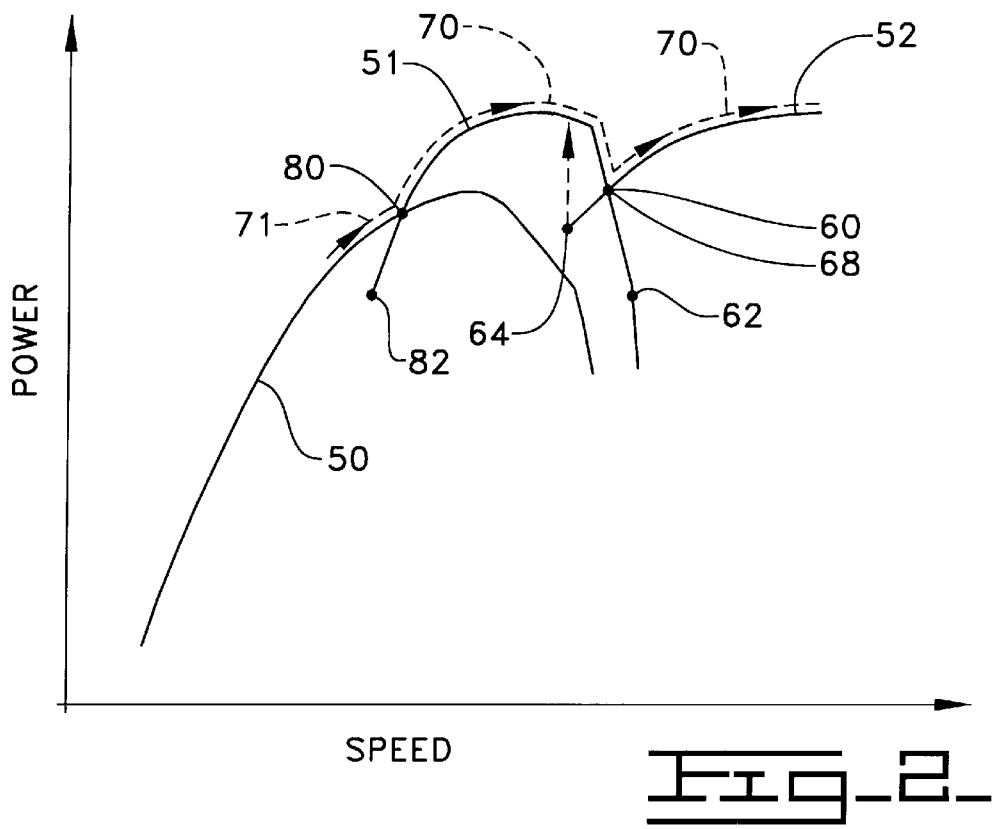
FIG. 2 is a graph of transmission power versus speed which illustrates an upshift from a first gear ratio to a second gear ratio at an aggressive shift point.

Referring now to FIG. 2, there is shown a set of exemplary power curves for an initial gear ratio 50, the first gear ratio 51, and the second gear ratio 52. The power curves illustrate that each gear ratio 50, 51, 52 provides enhanced power over certain speed ranges. For example, the initial gear ratio 50 provides enhanced power at lower speeds, the first gear ratio 51 provides enhanced power at intermediate speeds, and the second gear ratio 52 provides enhanced power at higher speeds.

The power curves for the first gear ratio 51 and the second gear ratio 52 intersect at a crossover point 68. At the crossover point 68, the power and speed of the output shaft 20 when the first gear ratio is engaged are equal to the power and speed of the output shaft 20 when the second gear ratio 52 is engaged.

It should be appreciated that as the transmission 14 accelerates along the path 70, the total power output of the transmission 14 is maximized. In particular, if the transmission 14 shifts from the first gear ratio 51 to the second gear ratio 52 prior to reaching the crossover point 68, then the power of the transmission output shaft 20, hereafter referred to as the transmission power, after the shift to the second gear ratio 52 is less than the transmission power prior to the shift to the second gear ratio 52. Thus, shifting from the first gear ratio 51 to the second gear ratio 52 prior to the crossover point 68 produces less power than a shift from the first gear ratio 51 to the second gear ratio 52 at the crossover point 68.

Moreover, if the transmission 14 upshifts at a shift point beyond the crossover point 68, such as the conservative shift point 62, then the transmission power after the crossover point 68 is less than the transmission power if the transmission 14 had shifted from the first gear ratio 51 to the second gear ratio 52 at the crossover point 68. Thus, shifting from the first gear ratio 51 to the second gear ratio 52 beyond the crossover point 68 produces less power than a shift from the first gear ratio 51 to the second gear ratio 52 at the crossover point 68.

Figure 3:
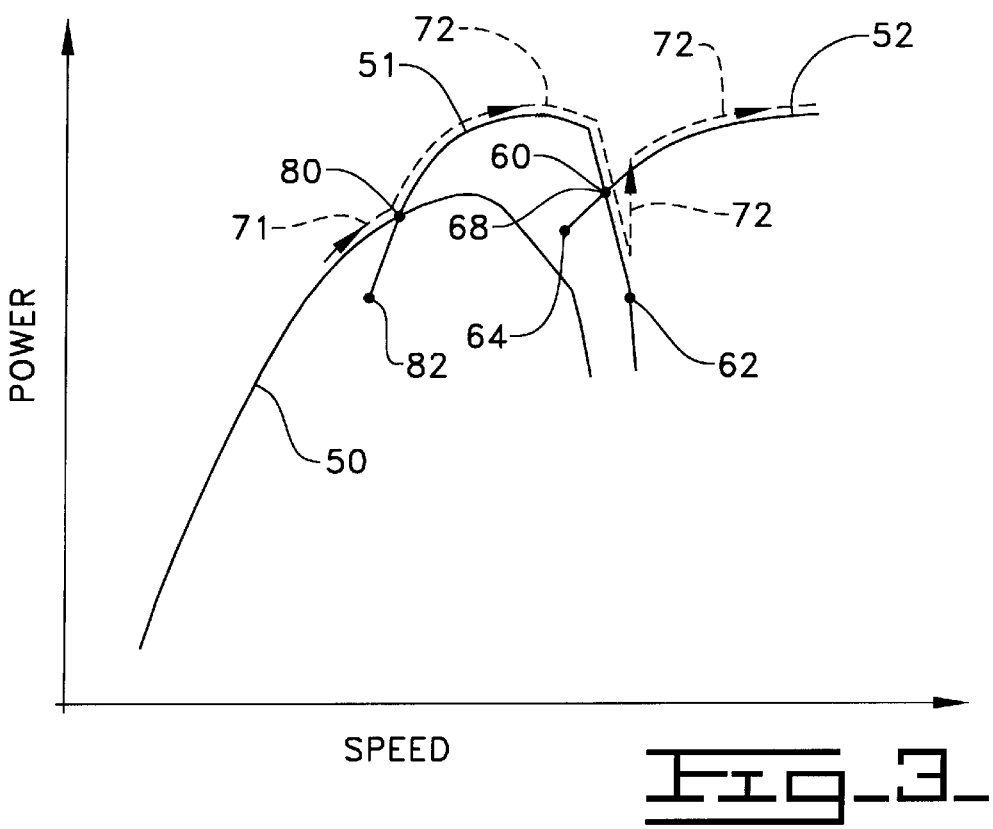
FIG. 3 is a graph similar to FIG. 2, but showing an upshift from the first gear ratio to the second gear ratio at a conservative shift point.

Because the total transmission power is maximized when the shift from the first gear ratio 51 to the second gear ratio 52 occurs at the crossover point 68, the aggressive shift point 60 should ideally occur at the crossover point 68. As shown in FIG. 3, the aggressive shift point 60 occurs at the crossover point 68. However, because the exact location of the crossover point 68 varies with drive line component tolerances, the aggressive shift point 60 may be selected as a point near the actual crossover point 68. In addition, due to torque interruption and power recovery during an upshift, it may be desirable to shift at a point slightly before or slightly after the actual crossover point 68.

The aggressive shift point 60 is optimally selected at a point as near to the actual crossover point 68 as can be determined by the controller 36. The controller 36 reads a predetermined crossover point 68 from the memory device 46. The predetermined crossover point 68 is based on test data for an exemplary sample of transmissions 14 operating at a number of tested load conditions. Due to variations in the manufacture of the transmission 14 and loads that may not exactly match one of the tested load conditions, the crossover point 68 determined by the controller 36 may differ slightly from the actual crossover point 68. Thus, the aggressive shift point 60 is selected near the crossover point 68 determined by the controller 36.

Referring now to FIG. 3, there is shown the upshift of the transmission 14 from the first gear ratio 51 to the second gear ratio 52 using the conservative shift point 62. As the transmission 14 accelerates along the path 72, the transmission 14 shifts from the first gear ratio 51 to the second gear ratio 52 at the conservative shift point 62 beyond the crossover point 68. As discussed above, shifting beyond the crossover point 68 reduces the power output of the transmission 14. While shifting at the conservative shift point 62 is undesirable from a performance standpoint, it is desirable to prevent the transmission 14 from hunting, or repeatedly cycling, between the first gear ratio 51 and the second gear ratio 52.

Figure 4:
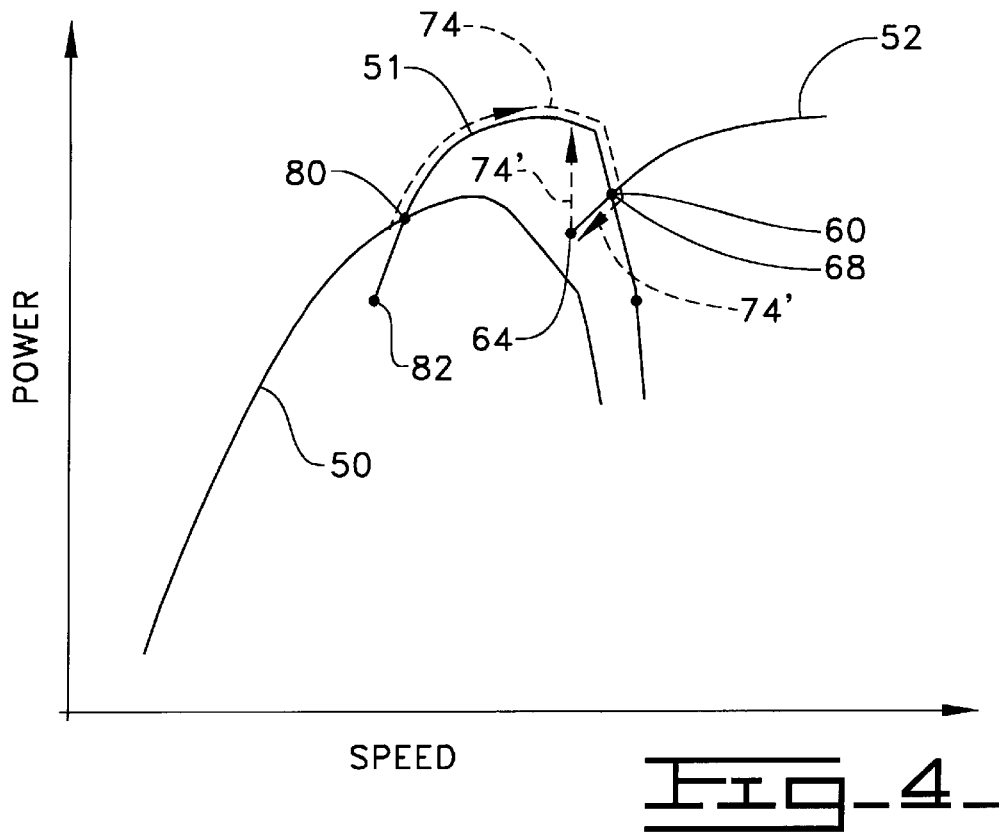
FIG. 4 is a graph similar to FIG. 2, but showing a upshift failure subsequent to the upshift at the aggressive shift point.

Referring now to FIG. 4, there is shown a typical hunting cycle of the transmission 14. As the transmission 14 accelerates along a path 74, the transmission 14 upshifts from the first gear ratio 51 to the second gear ratio 52 at the aggressive shift point 60. However, under heavy load conditions, the power transmitted to the output shaft 20 is temporarily interrupted when the first gear ratio 51 is disengaged from the output shaft 20 and the second gear ratio 52 is not fully engaged to the output shaft 20. When the power is interrupted, the work machine may decelerate because the loading due to weight on a grade or rolling resistance is still present. Under severe conditions, it is possible that the transmission output shaft 20 decelerates along the path 74' until it reaches the downshift point 64. At the downshift point 64, the controller 36 sends a downshift signal to the actuator assembly 32 so as to disengage the second gear ratio 52 from the output shaft 20 and engage the first gear ratio 51 to the output shaft 20.

It should be appreciated that if the load conditions remain the same, the transmission 14 will perform a cycle consisting of (i) accelerating along the path 74, (ii) upshifting from the first gear ratio 51 to the second gear ratio 52 at the aggressive shift point 60, (iii) decelerating at the point 60, 68, and (iv) downshifting from the second gear ratio 52 to the first gear ratio 51 at the downshift point 64. This cycle will be repeated until either the load on the transmission 14 changes or the upshift point is changed from the aggressive upshift point 60.

The hunting of the transmission 14 between the first gear ratio 51 and the second gear ratio 52 is not desirable. The hunting reduces the performance of the transmission 14 as the transmission 14 is repeatedly accelerating and decelerating, but never exceeding the speed associated with the point 60. Furthermore, hunting reduces the transmission performance due to the accumulation of torque interrupt intervals. This accumulation of torque interrupt intervals give the operator a perception of poor vehicle performance. In addition, the repeated engagement and disengagement of the of the first gear ratio 51 and second gear ratio 52 can cause a heat buildup which can reduce the useful life of components of the transmission 14, such as clutches (not shown), used to engage and disengage the first gear ratio 51 and second gear ratio 52 from the output shaft 20.

Figure 5:
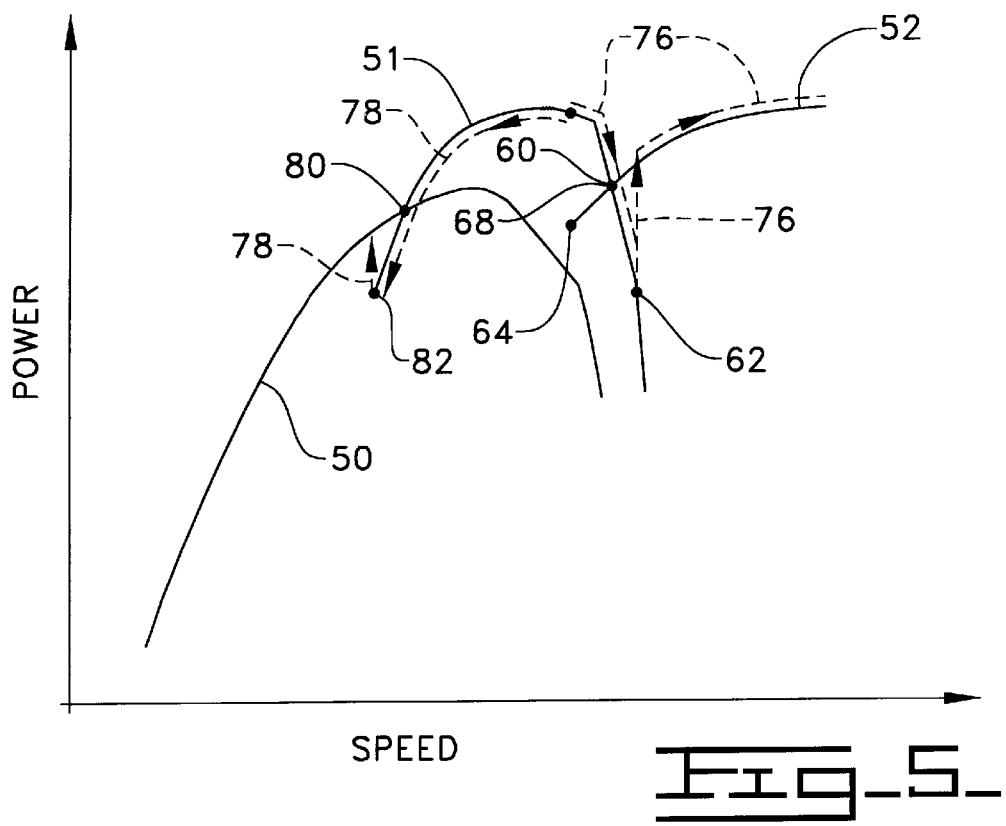
FIG. 5 is a graph similar to FIG. 4, but showing both a downshift subsequent to the upshift failure and an upshift at the conservative shift point subsequent to the upshift failure.

Referring now to FIG. 5, there is shown two situations whereby the transmission 14 can escape the hunting cycle described above. The first situation is where the transmission 14 accelerates along a path 76 so as to delay the upshifting from the first gear ratio 51 to the second gear ratio 52 to the conservative shift point 62. Delaying the upshift to the conservative shift point 62 reduces the likelihood that the transmission output shaft 20 will decelerate to the downshift point 64 so as to initiate another hunting cycle. Therefore, if the transmission 14 successfully completes an upshift from the first gear ratio 51 to the second gear ratio 52 at the conservative shift point 62, then the transmission 14 has broken out of the hunting cycle.

A second situation by which the transmission 14 can break out of the hunting cycle is when the transmission 14 downshifts to the initial gear ratio 50. In the second situation the transmission 14 decelerates along a path 78, in response to an operator input or a change in the loading on the transmission, until the transmission 14 downshifts from the first gear ratio 51 to the initial gear ratio 50 at the downshift point 82. The transmission 14 is no longer in a hunting cycle between the first gear ratio 51 and the second gear ratio 52 as neither of the first gear ratio 51 or the second gear ratio 52 is engaged.

INDUSTRIAL APPLICABILITY

In operation, using a first embodiment of the present invention, the transmission 14 initially operates with the initial gear ratio 50 engaged and is accelerating along the path 71 (see FIG. 2). The controller 36 generates an upshift signal which causes the transmission 14 to upshift from the initial gear ratio 50 to the first gear ratio 51 at the initial upshift point 80 (see FIG. 2) at a first time. The controller 36 starts a timer upon the generation of the upshift signal at the first time. As the transmission 14 accelerates to the aggressive shift point 60, the controller 36 measures the time period required for the transmission 14 to accelerate from the initial upshift point 80 to the aggressive shift point 60.

If the time period is less than a first predetermined period, then the controller 36 determines that the transmission 14 is operating in an aggressive mode of operation and generates an upshift signal at the aggressive shift point 60 thereby causing the transmission 14 to upshift from the first gear ratio 51 to the second gear ratio 52 at the aggressive shift point 60 as indicated by the path 70 of FIG. 2.

On the other hand, if the time period is more than the first predetermined period, then the controller 36 determines that the transmission 14 is operating in a conservative mode of operation and generates an upshift signal at the conservative shift point 62 thereby causing the transmission 14 to upshift from the first gear ratio 51 to the second gear ratio 52 at the conservative shift point 62 as indicated by the path 72 of FIG. 3.

It should be appreciated that the first predetermined time period is a time period that results in an acceptable percentage of upshift failures, or shifts from the first gear ratio 51 to the second gear ratio 52 at the aggressive shift point 60 which result in the hunting cycle described above. The percentage of acceptable upshift failures depends on the application in which the transmission 14 is used as well operator preferences.

Using a second embodiment of the present invention, the transmission 14 initially operates with the first gear ratio 51 engaged and is accelerating along the path 70 (See FIG. 2). As the transmission 14 accelerates to the aggressive shift point 60, the controller's 36 default is to determine that the transmission 14 is in the aggressive mode of operation, unless there has been a recent upshift failure. In response to determining that the transmission 14 is operating in the aggressive mode of operation, the controller 36 generates an upshift command at the aggressive shift point 60 illustrated by the path 70 shown in FIG. 2.

The controller 36 must determine if there is a upshift failure. The upshift failure is determined by the controller 36 if the controller 36 generates the downshift signal causing the transmission 14 to downshift from the second gear ratio 52 to the first gear ratio 51 (as indicated by the path 74' of FIG. 4) within a second predetermined period after the generation of the upshift signal. If the controller 36 determines that the transmission 14 has downshifted from the second gear ratio 52 to the first gear ratio 51 within the second predetermined time period, then the controller 36 determines that the transmission 14 is operating in the conservative mode of operation. Following an upshift failure, the controller 46 generates upshift signals at the conservative shift point 62 until the transmission either (i) downshifts to the initial gear ratio 50 or (ii) successfully upshifts at the conservative shift point 62. In the conservative mode of operation, the next upshift signal is generated at the conservative shift point 62 thereby causing the transmission 14 to upshift from the first gear ratio 51 to the second gear ratio 52 at the conservative shift point 62 as indicated by the path 72 of FIG. 3.

It should be appreciated that the second predetermined time period is analytically or experimentally determined. Downshifts from the second gear ratio 52 to the first gear ratio 51 that occur within the second predetermined time period are considered to likely be the initial step in the hunting cycle shown in FIG. 4. On the other hand, downshifts from the second gear ratio 52 to the first gear ratio 51 that occur outside of the second predetermined time period are considered not to be the initial step of the hunting cycle illustrated in FIG. 4.

The controller 36 determines that the transmission 14 remains in the conservative mode of operation until one of two situations occur. The first situation is where the transmission 14 accelerates along a path 76 (shown in FIG. 5) so as to delay the shifting from the first gear ratio 51 to the second gear ratio 52 until the conservative shift point 62 is reached. When the transmission 14 successfully completes an upshift from the first gear ratio 51 to the second gear ratio 52 at the conservative shift point 62, then the transmission 14 has broken out of the hunting cycle, and the controller 36 determines that the transmission 14 is once again operating in the aggressive mode of operation.

A second situation by which the controller 36 can determine that the transmission 14 has broken out hunting cycle is where the transmission 14 downshifts to the initial gear ratio 50. In the second situation, the transmission 14 decelerates along a path 78 (see FIG. 5), in response to either an operator input or an increase in work machine loading, until the transmission 14 downshifts from the first gear ratio 51 to the initial gear ratio 50 at the initial downshift point 82. The transmission 14 is no longer in a hunting cycle between the first gear ratio 51 and the second gear ratio 52, and the controller 36 determines that the transmission 14 has returned to the aggressive mode of operation.

When using either first embodiment or the second embodiment of the present invention the override 45 may be engaged. The override 45 may be engaged either by the operator, maintenance personnel, or may be engaged by the controller 46 during a startup period prior to the transmission 14 reaching a nominal operating temperature. When the override is engaged, an override signal is directed to the controller 36. Upon receipt of the override signal, the controller 36 determines that the transmission 14 is operating in the conservative mode of operation thereby causing the controller 36 to generate upshift signals at only the conservative shift point 62.

While the invention has been illustrated and described in detail in the drawings and foregoing description, such illustration and description is to be considered as exemplary and not restrictive in character, it being understood that only the preferred embodiment has been shown and described and that all changes and modifications that come within the spirit of the invention are desired to be protected.

What is claimed is:

1. A control apparatus for a transmission having (i) an initial gear ratio, (ii) a first gear ratio, (iii) a second gear ratio, and (iv) an output shaft, comprising:

an actuator assembly which disengages said first gear ratio from said output shaft and engages said second gear ratio to said output shaft in response to an upshift signal;

a memory device which stores (i) a conservative upshift point and (ii) an aggressive upshift point; and a controller operable to (i) read said aggressive shift point and said conservative shift point from said memory device, (ii) determine that the transmission is operating in said aggressive mode of operation when if the transmission reaches said aggressive shift point within a first predetermined time period after an upshift from said initial gear ratio to said first gear ratio, (iii) determine that the transmissions is operating in said conservative mode of operation when if the transmission fails to reach said aggressive shift point within the first predetermined time period after an upshift from said initial gear ratio to said first gear ratios, and (iv) generate said upshift signal at said aggressive upshift point if said transmission is operating in said aggressive mode of operation or generate said upshift signal at said conservative upshift point if said transmission is operating in said conservative mode of operation.

2. The apparatus of claim 1, wherein:

said aggressive shift point occurs near a crossover point where speed and power of said output shaft when said first gear ratio is engaged are equal to speed and power of said output shaft when said second gear ratio is engaged, and said conservative shift point occurs at a speed greater than said speed at said crossover point.

3. The apparatus of claim 1, wherein:

said controller determines that said transmission is operating in said aggressive mode of operation unless said controller determines that there has been an upshift failure, and said controller determines that said transmission is operating in said conservative mode of operation after said controller determines that there has been an upshift failure.

4. The apparatus of claim 4, wherein:

said actuator assembly can disengage said second gear ratio from said output shaft and engage said first gear ratio from said output shaft in response to a downshift signal, and said controller determines that there has been an upshift failure if said downshift signal is generated within a second predetermined time period after said generation of said upshift signal.

5. The apparatus of claim 4, said transmission further includes an initial gear ratio, wherein said controller determines that said transmission has returned to said aggressive mode of operation if either (i) said transmission downshifts from said first gear ratio to said initial gear ratio subsequent to determining that said upshift failure has occurred or (ii) said transmission upshifts from said first gear ratio to said second gear ratio subsequent to determining that said upshift failure has occurred.

6. The apparatus of claim 3, wherein:

said aggressive shift point occurs near a crossover point where speed and power of said output shaft when said first gear ratio is engaged are equal to speed and power of said output shaft when said second gear ratio is engaged, and said conservative shift point occurs at a speed greater than said speed at said crossover point.

7. The apparatus of claim 1, further including an override device which can be engaged or disengaged, wherein said controller generates said upshift signal at said conservative upshift point when said override device is engaged.

8. A method of controlling a transmission assembly having (i) a transmission with an initial gear ratio, a first gear ratio, a second gear ratio, and an output shaft, (ii) an actuator assembly which disengages the first gear ratio from the output shaft and engages the second gear ratio to the output shaft in response to an upshift signal, (iii) a memory device, and (iv) a controller, comprising the steps of storing a conservative upshift point and an aggressive upshift point in the memory device;

reading the aggressive shift point and the conservative shift point from the memory device with the controller;

determining that the transmission is operating in the aggressive mode of operation when the transmission reaches the aggressive shift point within a first predetermined time period after a shift from the initial gear ratio to the first gear ratio or operating in the conservative mode of operation when the transmission does not reach the aggressive shift point within the first predetermined time period after a shift from the initial gear ratio to the first gear ratio; and generating the upshift signal at the aggressive upshift point if the transmission is operating in the aggressive mode of operation or generate the upshift signal at the conservative upshift point if the transmission is operating in the conservative mode of operation.

9. The method of claim 8, the storing step further includes the steps of:

calculating the aggressive shift point near a crossover point where speed and power of the output shaft when the first gear ratio is engaged are equal to speed and power of the output shaft when the second gear ratio is engaged, and calculating the conservative shift point at a speed greater than the speed at the crossover point.

10. The method of claim 8, the determining step further including the steps of:

determining that the transmission is operating in the aggressive mode of operation unless the controller determines that there has been an upshift failure; and determining that the transmission is operating in the conservative mode of operation after the controller determines that there has been an upshift failure.

11. The method of claim 10, further including the steps of:

disengaging the second gear ratio from the output shaft with the actuator assembly and engaging the first gear ratio to the output shaft in response to a downshift signal; and determining that there has been an upshift failure if the downshift signal is generated within a second predetermined time period after the generation of the upshift signal.

12. The method of claim 10, further including the step of determining that the transmission has returned to the aggressive mode of operation if either (i) the transmission downshifts from the first gear ratio to the initial gear ratio subsequent to determining that the upshift failure has occurred or (ii) the transmission upshifts from the first gear ratio to the second gear ratio subsequent to determining that the upshift failure has occurred.

13. The method of claim 10, the storing step further includes the steps of:

calculating the aggressive shift point near a crossover point where speed and power of the output shaft when the first gear ratio is engaged are equal to speed and power of the output shaft when the second gear ratio is engaged, and calculating the conservative shift point at a speed greater than the speed at the crossover point.

14. The method of claim 8, the transmission assembly further including an override device which can be engaged or disengaged, further including the step of:

generating the upshift signal at the conservative upshift point when the override device is engaged.

* * * * *